United States Patent [19]

Fujii et al.

[11] Patent Number: 4,860,494
[45] Date of Patent: Aug. 29, 1989

[54] VERTICALLY MOVABLE WINDOW GLASS RETAINER FOR MOTOR CAR DOOR

[75] Inventors: Hiroshi Fujii; Atsushi Takahashi, both of Yokohama, Japan

[73] Assignees: Nissan Motor Co., Ltd.; Nifco Inc., both of Yokohama, Japan

[21] Appl. No.: 183,073

[22] Filed: Apr. 19, 1988

[30] Foreign Application Priority Data

Apr. 20, 1987 [JP] Japan ............................. 62-58686[U]

[51] Int. Cl.4 ............................................... E06B 7/16
[52] U.S. Cl. ....................................... 49/493; 49/377; 49/502
[58] Field of Search ................. 49/377, 502, 440, 441, 49/415, 416, 493

[56] References Cited

U.S. PATENT DOCUMENTS 2,174,530 10/1939 Reid .................................. 49/377 X
2,664,603 1/1954 McKinney ............................ 49/377
3,763,596 10/1973 Anderson ........................... 49/493 X
4,442,634 4/1984 Kimura ............................... 49/377 X
4,481,736 11/1984 Norton ............................... 49/377 X
4,696,128 9/1987 Fukuhara ............................ 49/377 X Primary Examiner—James R. Brittain
Attorney, Agent, or Firm—Oblon, Spivak, McClelland, Maier & Neustadt

[57] ABSTRACT

A window glass retainer comprises a base portion, an inner extension extending therefrom, an upright portion extending therefrom and a frame. Opposed surfaces of said base and upright portions are provided with mutually inwardly projected pawls engaged forwardly and rearwardly in mounting holes formed in an inner leg portion of a molding. The back surface of the frame is provided with projections, which penetrate a cloth member to the back side thereof and are engaged in recesses formed in the inner extension.

1 Claim, 5 Drawing Sheets

VERTICALLY MOVABLE WINDOW GLASS RETAINER FOR MOTOR CAR DOOR

BACKGROUND OF THE INVENTION

1. Field of the Invention

This invention relates to a window glass retainer made of a plastic material which is held in sliding contact with the outer surface of a window glass raised and lowered inside a motor car door.

2. Prior Art Statement

Japanese Utility Model Public Disclosure SHO 58-151276 discloses a window glass retainer, which comprises a base portion in contact with the inner surface of an inner leg portion of a molding mounted on the lower end of a motor car door window, the inner surface facing a window glass surface, an inner extension extending inwardly from a lower portion of the base portion in the thickness direction of the molding inner leg portion, an upright portion inwardly extending from the free end of the inner extension of a frame, i.e., a clamping frame, mounted on both the upright portion and inner extension and having a central opening, and a cloth member having an embedded fur portion in contact with the window glass surface and detachably stretched over the opening.

Opposed surfaces of the base and upright portions are provided with teeth mutually inwardly projecting and received in a groove formed in the molding inner leg portion in the longitudinal direction thereof. Also, one of opposed surfaces of the inner extension and frame is formed with a transverse groove in which the entire width of a lower portion of the cloth member is received, and the other opposed surface is formed with a ridge received in the transverse groove.

With the above prior art window glass retainer, however, the mechanical strength of its mounting on the molding is low. In addition, the retainer is liable to be moved with respect to the molding in the longitudinal direction. More specifically, with the prior art window glass retainer the teeth which project inwardly from the opposed surfaces of the base and upright portions are received only shallowly in the groove formed in the molding in the longitudinal direction thereof. Therefore, the teeth are liable to be detached from the groove when a downward force is applied to the window glass retainer. In addition, the teeth are easily moved along the longitudinal groove in the molding when a force is applied to the molding in the longitudinal direction.

Further, the cloth member having the embedded fur portion is liable to move when the frame is mounted. In other words, when mounting the frame, the cloth member has to be held urged against the surfaces of the inner extension and upright portion with the hand so that it will not move. However, the cloth member has to be released when mounting the frame, and at this time it is subject to movement. Further, when mounting the window frame a portion of the cloth member is pushed into the transverse groove by the transverse ridge. At this time, the portion noted above is liable to be pulled to result in a possible displacement of the cloth member.

OBJECT AND SUMMARY OF THE INVENTION

An object of the invention is to provide a vertically movable window glass retainer for a motor car door, which is free from movement of the cloth member having the embedded fur portion at the time of the mounting and also free from its occasional displacement in the longitudinal direction.

To attain the above and other object of the invention, opposed surfaces of the base and upright portions are provided with mutually inwardly projected pawls engaged forwardly and rearwardly in mounting holes formed in an inner leg portion of a molding, and the back surface of a frame is provided with projections which penetrate a cloth member to the back side thereof and are engaged in recesses formed in the inner extension.

To assemble the window glass retainer having the above structure, the embedded fur portion of the cloth member is inserted through the opening of the frame from the back side so that it projects forwardly from the opening, and the lower edge of the cloth member is retained by fitting it on projections projecting from the back surface of the frame. Then, tips of the projections penetrating the cloth member are engaged in recesses formed in the upright portion and/or inner extension. In this state, the frame is secured to the upright portion and inner extension. When the frame is secured, a portion of the cloth member rearwardly extending from the opening of the frame is clamped between the back surface of the frame and surfaces of the upright portion and inner extension, and also the cloth member is locked against movement by the projections penetrating the cloth member.

When the cloth member has been stretched in the frame, the retainer is mounted on the molding inner leg portion. To this end, the molding inner leg portion is preliminarily formed with mounting holes spaced apart at intervals corresponding to the interval of mounting of a plurality of window glass retainers so that the pawls projecting inwardly from the opposed surfaces of the base and upright portions are fitted in these mounting holes. Then, the lower edge of the inner leg portion beneath the mounting holes is inserted into the space between the base and upright portions. At this time, the pawls inwardly projecting from the opposed surfaces of the base and upright portions are engaged with the inner and outer surfaces of the inner leg portion, and the inner leg portion is inserted by causing outward flexing of the upright portion and increasing the gap between the base and upright portions. When the pawls reach the mounting holes in the inner leg portion, they are snap fitted in these mounting holes by the elastic restoring force of the upright portion. In this way, the molding inner leg portion is retained in the space between the base and upright portions.

Thus, movement of the window glass retainer in the longitudinal direction of the molding is prevented by the engagement between the pawls and the mounting holes.

The above and other objects and features of the invention will become more apparent from the following detailed description with reference to the accompanying drawings.

DETAILED DESCRIPTION OF THE PREFERRED EMBODIMENT

Figure 2:
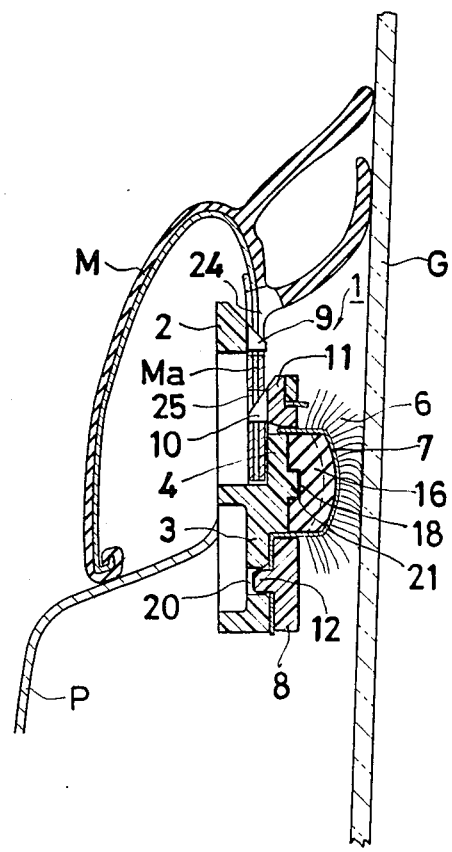
FIG. 2 is a sectional view showing the window glass retainer of FIG. 1 mounted in a molding.
Figure 3:
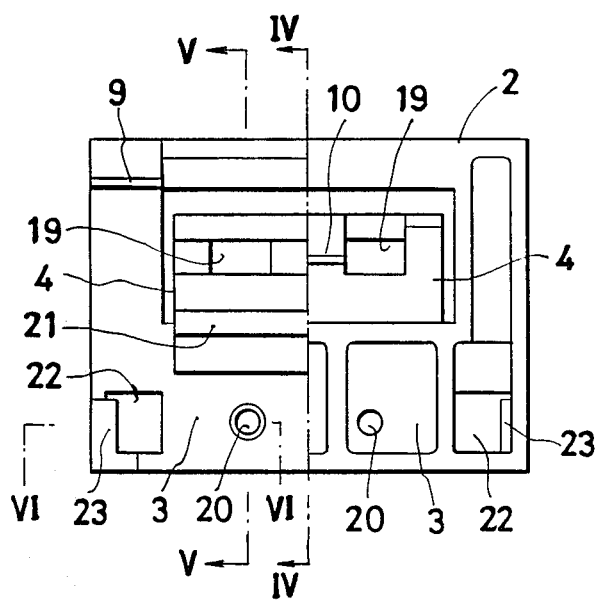
FIG. 3 is a plan view showing a base of the window glass retainer of FIG. 1, one half of the base being viewed from the front and the other half viewed from the back.
Figure 4:
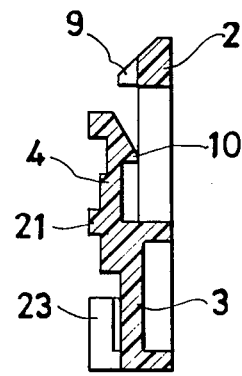
FIG. 4 is a sectional view taken along line IV—IV in FIG. 3.

The drawings illustrate one embodiment of the vertically movable window glass retainer for a motor car according to the invention. In FIG. 2, reference symbol P designates a motor car door outer panel, symbol M a waist molding mounted on a window lower edge of the outer panel P, and symbol G a window glass which is vertically movable by a moving mechanism (not shown) provided in the door. The retainer 1 is mounted on an inner leg portion Ma of the molding M facing the car interior and in sliding contact with the outer surface of the vertically movable window glass G.

Figure 1:
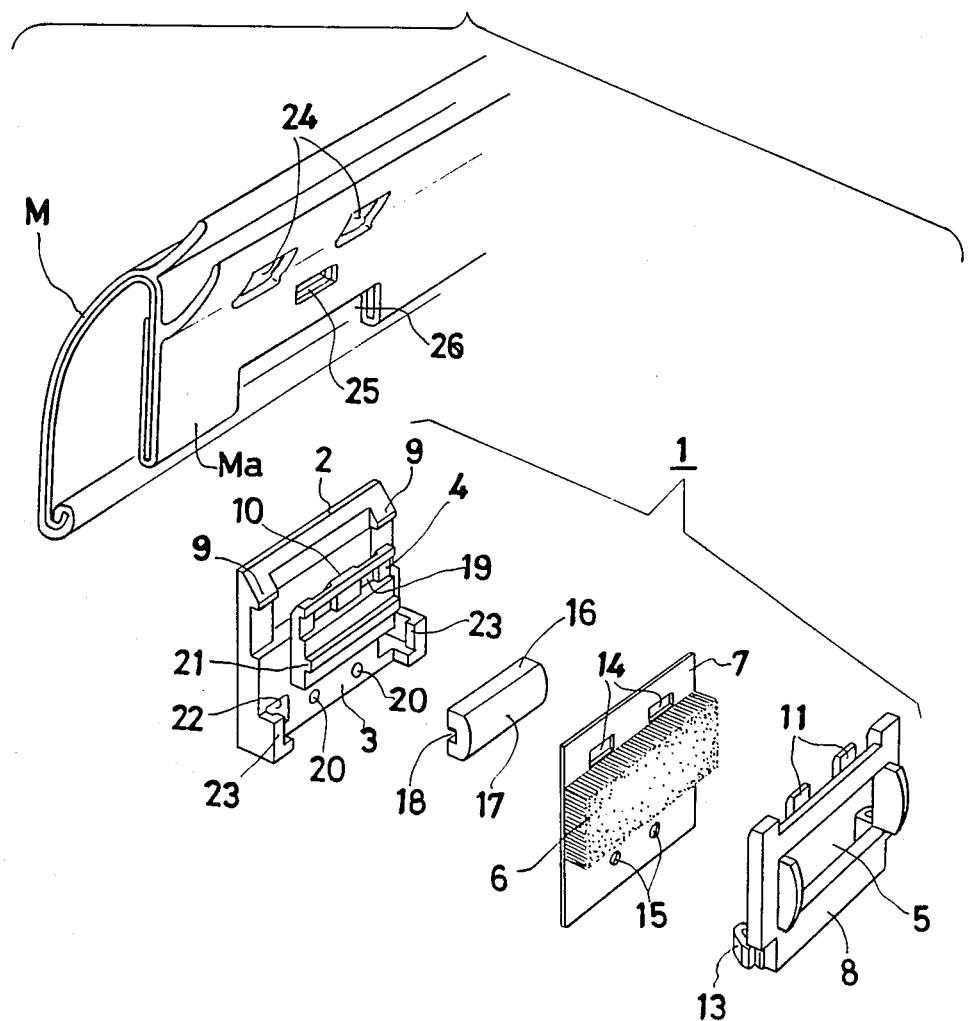
FIG. 1 is an exploded perspective view showing an embodiment of the vertically movable window glass retainer according to the invention.

As shown in FIG. 1, the retainer 1 includes a base portion 2 which is to be in contact with the inner leg portion Ma of the molding M, an inner extension 3 extending from a lower portion of the base portion 2 in the thickness direction of the inner leg portion Ma of the molding M, an upright portion 4 extending upright from the upper end of the inner extension 3 such that the inner leg portion Ma of the molding M is inserted from above and clamped between the base portion 2 and the upright portion 4, and a window frame 8 to be mounted on the upright portion 4 and inner extension 3 and having a central window 5, over which a cloth member 7 with an embedded fur portion 6 to be in contact with the window glass surface is held removably stretched. The individual components except for the cloth member 7 with the embedded fur portion 6 are plastic moldings. In the illustrated embodiment, the frame 8 is a plastic molding such that it is united via a fragile portion (not shown) to the lower end of the inner extension 3. In use the frame 8 is separated from the base portion 2 at a fragile portion, or alternatively it is molded separately.

The base portion 2, as shown in FIGS. 3 to 6, has a rectangular aperture or opening formed in a portion corresponding to the upright portion 4 and also has inwardly projecting pawls 9 each formed at each end of the upper edge. A central portion of the upper edge of the upright portion 4 has an inwardly projecting pawl 10 opposing and having substantially the same shape as the pawls 9 of the base portion 2.

Figure 7:
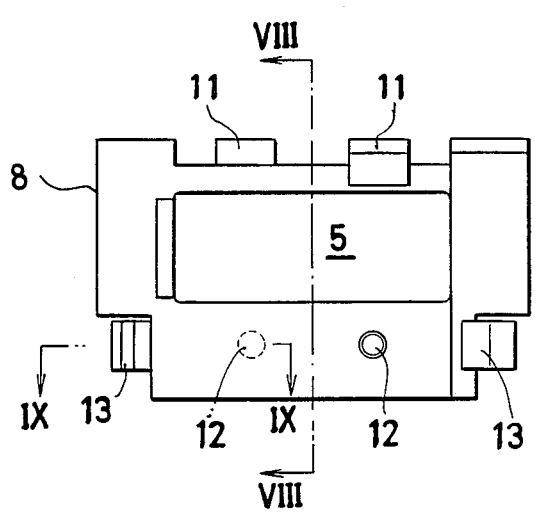
FIG. 7 is a plan view showing a window frame section of the window glass retainer of FIG. 1, one half of the section being viewed from the front and the other half viewed from the back.
Figure 8:
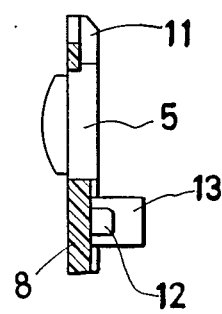
FIG. 8 is a sectional view taken along line VIII—VIII in FIG. 7.
Figure 9:
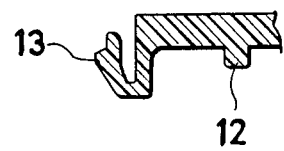
FIG. 9 is a sectional view taken along line IX—IX in FIG. 7.
Figure 11:
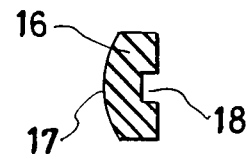
FIG. 11 is a longitudinal sectional view showing an elastic pad of the window glass retainer of FIG. 1.

As shown in FIGS. 7 to 9, the frame 8 is like a picture frame, having a substantially central, large rectangular opening 5. It has a pair of, i.e., left and right, upward projections 11 projecting from the back side of the upper edge and also a pair of, i.e., left and right, pin-like projections 12 projecting from the back side surface adjacent to the lower edge. Further, it has a pair of, i.e., left and right, substantially U-shaped locking portions 13 each extending to the back side from each end of the lower edge, as shown in FIG. 9.

Figure 10:
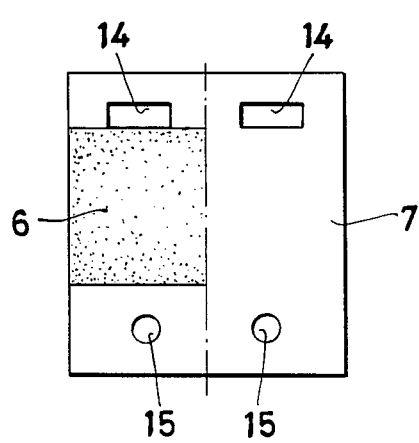
FIG. 10 is a plan view of a cloth member, one half being viewed from the front and the other half viewed from the back.

The cloth member 7 which is mounted on the frame 8, as shown in FIGS. 1 and 10, has a width smaller than the width of the opening 5 and a height sufficiently greater than the height of the opening 5, so that when it is stretched over the opening 5 of the frame 8, its upper and lower end portions rearwardly extend beyond the opening 5. Its upper end portion has a pair of, i.e., left and right, slot-like holes 14, which extend in the width direction of the cloth member 7 and are penetrated by the upward projections 11 noted above, and also its lower end portion has a pair of, i.e., left and right, circular small holes 15 penetrated by the pin-like projections 12. The embedded fur portion 6 is provided in a strip-like fashion on a central portion of the cloth member 7.

Reference numeral 16 designates an elastic pad made of rubber which is to be in elastic contact with the cloth member 7 on the side thereof opposite the embedded fur portion 6. The elastic pad 16 is slightly smaller in size than the opening 5 of the frame 8 and has a curved sectional profile. It has a convex surface 17 to be in contact with the cloth member 7 on the side thereof opposite the embedded fur portion 6 and a transverse groove 18 formed on the back side.

The upright portion 4 and inner extension 3 are provided with recesses 19 and 20, in which the projections 11 and 12 of the frame 8 are received. In this embodiment, the recesses 19 and 20 are formed in the upright portion 4 and inner extension 3 in positions corresponding to the projections 11 and 12.

Figure 5:
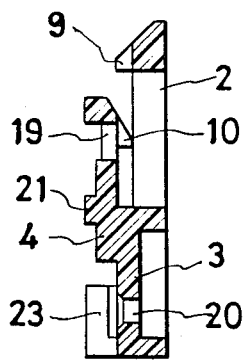
FIG. 5 is a sectional view taken along line V—V in FIG. 3.

More specifically, as shown in FIG. 5, the upright portion 4 is formed adjacent to the upper edge with a pair of, i.e., left and right, rectangular recesses 19, in which the ends of the upright projections 11 are hooked, and also its vertically intermediate portion is provided with a transverse ridge 21 which is received in the transverse groove 18 of the elastic pad 16.

Figure 6:
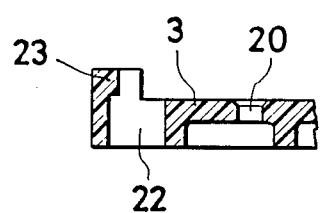
FIG. 6 is a sectional view taken along line VI—VI in FIG. 3.

The inner extension 3, as shown in FIGS. 5 and 6, has a pair of, i.e., left and right, circular small holes 20 to be penetrated by the pin-like projections 12 and also a pair of, i.e., left and right, snap holes 22, in which the locking portions 13 projecting from the opposite ends of the window frame 8 adjacent to the lower edge thereof are snapped. It further has L-shaped guide walls 23 partly surrounding the snap holes 22.

The window glass retainer 1 having the above construction is assembled as follows.

Figure 12:
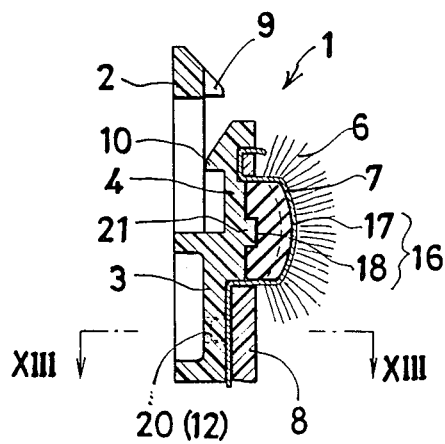
FIG. 12 is a sectional view showing the window glass retainer of FIG. 1 in an assembled state.

As shown in FIG. 1, the holes 14 formed in the cloth member 7 adjacent to the upper edge thereof are fitted on the upward projections 11 from above with the embedded fur portion 6 directed forwards from the back side of the frame 8, then the embedded fur portion 6 is curved and pushed into the opening 5, and then the holes 15 formed in a lower portion of the cloth member 7 that is found rearwardly of the opening 5 are fitted on the pin-like projections 12 of the frame 8 (FIG. 12). The cloth member 7 which is thus mounted by making use of the projections 11 and 12 of the frame 8, is temporarily held stretched over the opening 5 of the frame 8.

In this state, the elastic pad 16 is pushed into the opening 5 from behind with its convex surface 17 directed forwards. When the elastic pad 16 is pushed into the opening 5, the cloth member 7 is pushed from behind by the elastic pad 16 and is thus stretched taut. With this tension, the holes 14 and 15 of the cloth member 7 are no longer detached from the projections 11 and 12 of the frame 8, and the convex surface 17 of the elastic pad 16 is brought into elastic contact with the back side of the embedded fur portion 6 (FIG. 12).

Figure 13:
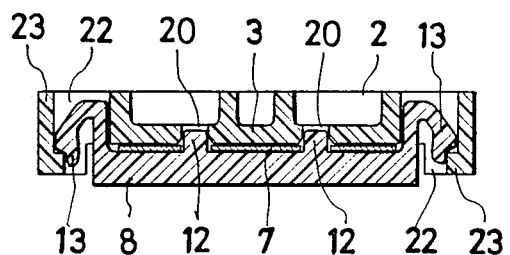
FIG. 13 is a sectional view taken along line XIII—XIII in FIG. 12.

After the cloth member 7 has been stretched on the frame 8 by using the elastic pad 16 in the above way, the upward projections 11 of the frame 8 are inserted obliquely from below into the recesses 19 of the upright portion 4 adjacent to the upper edge thereof, and the lower edge of the frame 8 is strongly pushed against the inner extension 3 with the hook tips of the upward projections 11 hooked on the edges of the recesses 19 and the tips of the pin-like projections 12 inserted into the recesses 20. When the frame 8 is pushed, the locking portions 13 of the frame 8 are engaged with the inner surfaces of the guide walls 23 to be snapped in the snap holes 22 as they are pushed against the guide walls 23 and inwardly flexed. Thus, the frame 8 is secured to the upright portion 4 and inner extension 3 (FIG. 13).

With the frame 8 secured to the surfaces of the upright portion 4 and inner extension 3 in the above way, the upper edge of the cloth member 7 is pinched between the back surface of the upper edge of the frame 8 and the surface of the upright portion 4, and the lower edge of the cloth member 7 is pinched between the back surface of the lower edge of the frame 8 and the surface of the inner extension 3 (FIG. 12). In addition, the projections 11 and 12 of the window frame 8 are inserted in the holes 14 and 15. Thus, the movement of the cloth member 7 is prevented. Further, the transverse ridge 21 of the upright portion 4 is received in the transverse groove 18 of the elastic pad 16, so that the elastic pad 16 is secured in position and there is no possibility of movement of the cloth member 7 due to displacement of the elastic pad 16.

The window glass retainer 1 which has been assembled in the above way is mounted on the inner leg portion Ma of the molding M. As shown in FIG. 1, the inner leg portion Ma of the molding M is preliminarily formed with a pair of mounting holes 24 for receiving the pawls 9 projecting from the inner surface of the base portion 2, a mounting hole 25 located at a position below midway between the holes 24 for receiving the pawl 10 projecting from the inner surface of the upright portion 4 and a notch 26 located at a position below the mounting holes 24 and 25 and having a width sufficient to receive the retainer 1 fitted upwardly. The notch 26 may be dispensed with.

The retainer 1, having been assembled, is fitted upwardly in the notch 26 of the inner leg portion Ma. The lower end of the inner leg portion Ma is fitted into the space between the base and upright portions 2 and 4 with the embedded fur portion 6 of the retainer 1 directed toward the car interior. When the inner leg portion Ma is inserted, the pawls 9 and 10 projecting inwardly from the opposed surfaces of the base and upright portions 2 and 4 are engaged with the inner and outer surfaces of the inner leg portion Ma. At this time, the upright portion 4 is outwardly flexed by being pushed by the outer surface of the inner leg portion Ma, while the inner leg portion Ma is inserted by increasing the space between the base and upright portions 2 and 4.

When the lower edge of the inner leg portion Ma reaches the top of the inner extension 3, the pawls 9 and 10 have reached the mounting holes 24 and 25, and they are snapped in the mounting holes 24 and 25 by the elastic restoring force of the upright portion 4, whereby the inner leg portion Ma of the molding M is retained in the space between the base and upright portions 2 and 4 (FIG. 2).

When a plurality of window glass retainers 1 have been mounted at suitable intervals on the inner leg portion Ma of the molding M, a plurality of molding clips (not shown) are mounted at intervals along the lower edge of the outer panel P, and the molding M is mounted via the molding clips with its inner leg portion Ma directed toward the car interior. When the molding M is mounted in this way, the embedded fur portion 6 of each window glass retainer 1 mounted on the molding M is sliding contact with the outer surface of the window glass G which can be raised and lowered inside the door (FIG. 12).

As has been described in the foregoing, according to the invention the upper edge of the cloth member can be held fitted on the upward projections projecting from the back side of the frame when stretching the cloth member over the frame. Thus, the cloth member does not easily move even if it is released when mounting the window frame on the upright portion and inner extension. Further, even after the frame has been mounted on the upright portion and inner extension, the projections penetrating the cloth member are engaged in the recesses formed in the upright portion and/or inner extension, so that it is possible to eliminate not only the movement of the cloth member but also the rattling of the frame.

Further, since the pawls inwardly projecting from the opposed surfaces of the base and upright portions are fitted in the mounting holes formed in the inner leg portion of the molding, it is possible to obtain a very high mechanical strength of mounting of the window glass retainer. Further, the window glass retainer can be prevented from movement in the longitudinal direction of the molding by the engagement between the pawls and the mounting holes.

Obviously, many variations and modifications of the present invention can be made in the light of the above teachings. It is therefore to be understood that within the scope of the appended claim, the present invention may be practiced otherwise than as specifically described herein.

What is claimed is:

1. A vertically movable window glass retainer for a motor car door, comprising:
   a base portion to be in contact with an inner surface of an inner leg portion of a molding mounted on a lower end of a motor car door window, the inner surface being positionable in facing opposition to a window glass surface,
   an inner extension extending inwardly from a lower portion of said base portion in the thickness direction of the molding inner leg portion and having a free end,
   an upright portion upwardly extending from the free end of said inner extension,
   opposed surfaces of said base and upright portions being provided with respective, inwardly projecting pawls which can be engaged forwardly and rearwardly in mounting holes formed in the molding inner leg portion, a frame mounted on both said upright portion and said inner extension and having a central opening, said frame also having locking portions for locking said frame to said inner extension, and a cloth member having an embedded fur portion for contact with the window glass surface and detachably stretched over said opening, a back surface of said frame being provided with upward projections and pin-like projections penetrating through said cloth member for preliminarily holding said cloth member independently of said inner extension and said upright portion, said cloth member being clamped between said inner extension, said upright portion and said frame by said upward projections and pin-like projections engaging in recesses of said upright portion and inner extension when said frame is mounted on said upright portion and said inner extension.

* * * * *